United States Patent [19]

Fothergill

[11] 3,854,117
[45] Dec. 10, 1974

[54] PHASE-DIFFERENCE DETECTOR

[76] Inventor: Noel O. Fothergill, 2210-46 Loyola Ave., Ottawa, Ontario, Canada

[22] Filed: Aug. 10, 1973

[21] Appl. No.: 387,401

[52] U.S. Cl............... 340/16 R, 324/83 A, 324/87, 328/133, 340/6 R
[51] Int. Cl............................................. G01s 3/80
[58] Field of Search............... 340/6 R, 16 R, 16 P; 324/83 A, 87, 88; 328/133

[56] References Cited
UNITED STATES PATENTS
3,209,254 9/1965 Hossmann........................ 324/87 X
3,219,938 11/1965 Greening............................ 328/133

Primary Examiner—Richard A. Farley
Attorney, Agent, or Firm—R. S. Sciascia; P. Schneider

[57] ABSTRACT

In sound direction-finding equipment, at least two microphones are used in a broadside array manner to ascertain the direction of a sound source. The outputs of the two microphones are applied as separate inputs to a discriminator which applies the rules:

a. when the input signals are both of the same polarity, the discriminator selects the input closer to zero and presents it as the output;

b. when the input signals are of opposite polarity, the device presents zero as the output.

The nature of the output from the discriminator enables very small directional errors in the orientation of the broadside-array to be ascertained, permitting more accurate direction-finding than conventional schemes. More than two microphones can be used, combined in pairs as described above, and with the outputs so derived also combined in pairs to give a single final output used for directional-error-indication.

The invention is applicable also to non-aural direction finding equipment and generally to the detection of phase-difference between the two signals.

10 Claims, 12 Drawing Figures

PHASE-DIFFERENCE DETECTOR

BACKGROUND OF THE INVENTION

This invention relates to phase-difference detection between two signals.

It was evolved in connection with target detection and tracking systems, and finds application both to military target tracking and to civilian monitoring such as the surveillance of aircraft or vehicles adjacent to an airfield.

Target detection and tracking systems fall into two groups, the first being "active" systems such as radar systems in which an electromagnetic signal is transmitted, and the reflected signal detected; and the second being "passive" systems, for example an acoustic "listening post", in which no transmission of energy towards the target takes place, and one relies completely on signals originating from the target. It will be appreciated that there are available both "acoustic" and "electromagnetic" systems which are active systems, and alternative systems which are passive systems.

Passive systems have several advantages over active systems; a passive system provides the observed target with no indication that it is being observed, and further provides the observed target with no information as to the whereabouts of the tracking station, whereas an active system makes this information available to the target. Further, when several closely positioned targets are to be observed, the radiated energy directed primarily towards one target is likely to produce reflections from one or more of the adjacent or similarly directed targets, tending to lead to confusion between the signals received at the tracking station.

In all passive detection or receiving systems, whether electromagnetic or acoustic, the fundamental limit to the capability of the system is set by the background "noise" (either acoustic or electromagnetic) against which the system must work. It is therefore important that the system be so designed as to reduce the effective noise background as far as possible. One means of doing this is "spatial" processing, in which highly directional beams of preferred reception are formed, for example by arrays of point-located receivers, or by the use, for example, of parabolic reflectors in conjunction with a single receiver. Another means of reducing effective noise background is "temporal" processing, in which time-oriented devices are utilized, for example, gated observation of parts only of incoming signals, the use of band-pass filters, or time-averaging detectors.

Most practical passive systems employ both spatial and temporal processing, and the overall processing gain can be ascertained if knowledge of the statistical properties of the noise, and of the expected target signal, are known. Generally, known systems employ linear processing both for beam forming in arrays and also for filtering or band limiting, where these are used.

With linear processing systems, the detected error when the microphone array is off-target varies (for the small errors under consideration in practice) linearly with the angular off-set from the target. As a result, as higher accuracy and smaller errors are sought, the errors to be detected become very small in terms of the noise to be contended with in the system.

By the present invention, which is the subject of my currently copending Canadian application, Ser. No. 115,982, filed June 18, 1971, a novel approach to measurement of phase-difference between two signals is utilized, which considerably improves the ability to measure very small phase errors compared with the results of linear phase-error detectors.

SUMMARY OF THE INVENTION

According to the present invention, a phase-difference detector adapted to receive first and second versions from two different sources of a common input signal, with a variable phase difference between the two versions, and to provide an output which is a non-linear indication of the said phase difference, includes (a) means arranged to compare the two versions, and, when both are of the same polarity, to select the version which has an instantaneous value closer to zero and to present that version as the instantaneous output; (b) means arranged to compare the two versions, and when the two versions are of opposite polarity, to present zero as the instantaneous output.

BRIEF DESCRIPTION OF THE DRAWING

The invention will now be described, by way of example, with reference to the accompanying drawing, in which.

DETAILED DESCRIPTION

Figure 1:
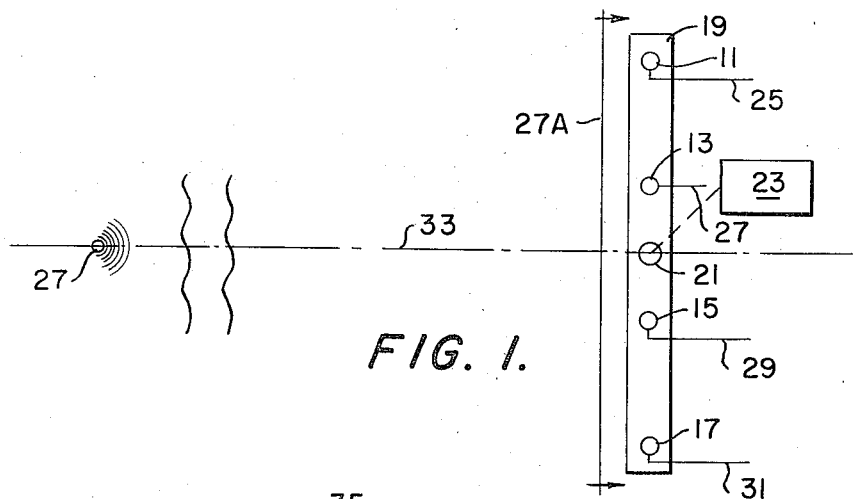
FIG. 1 is a diagram of the arrangement of four microphones used for finding the bearing of a sound source.

Referring first to FIG. 1, the four microphones 11, 13, 15 and 17 are arranged along a straight line on a member 19 which can be rotated about a normal axis 21 and the orientation of which can be accurately read-out in known manner by an indicating device 23. In known devices, the outputs on the microphone leads 25, 27, 29 and 31 are combined to enable the aural axis 33 of the arrangement to be directed at a distant point sound source 27. The source 27 is so far from the microphone that the wave front 27A is substantially planar.

In early forms of direction-finding devices, the outputs from two spaced microphones, e.g. the microphones 11 and 17, were applied respectively to the two ears of an operator, who made use of his binaural sense to detect phase difference between the sound signals received by the two microphones, and then made corrective movements of the member 19 until the phase difference was (according to his estimation) zero. In more recent systems, the outputs of the four microphones 11 through 17 are combined in an additive manner and again the member 19 can be re-oriented to ascertain when its aural axis 33 is directed at the sound source 27.

In use of such a known system, background noise originated from directions lying to one side of the aural axis 33 is reduced in importance by the spatial distribution of the microphones. Thus there will be a phase-difference between the version of such an off-axis sound received by microphone 11 and the version of the same sound received by microphone 17, and as long as the spacing of the microphones is sufficient, in terms of the wavelength of the off-axis sound, there will be a partial cancellation effect when the different versions of the off-axis sound are combined in the said additive manner. By the use of a subsequent band-pass filter, sounds which have frequencies considerably higher and considerably lower than that of the sound source 27 can be discarded, and the result of the combination of spatial processing (by the distribution of the microphones) and temporal processing (by the use of band-pass filters) is to reduce the effective noise level against which the wanted signals must be monitored.

Where a highly directional effect is required, it has up to now been found necessary to resort to large numbers of microphones in a physically large array, and practical limitations arise as to the permissible size. Further, if the array becomes very large, problems arise in that one cannot rely upon the received wavefront of the sound from the source being planar, partly because of propagational effects. Further, where temporal processing such as filtering is used, the frequency stability of the signal received from the sound source must be considered. For example, due to target characteristics or doppler effect, the received frequency may vary appreciably. As a result, the pass band of the filters must be made wide enough to allow for possible center-frequency variations in the sound source, and this reduces the effectiveness of the filter in improving the signal-to-noise ratio.

By the present invention, the signals received from the four microphones 11, 13, 15 and 17 are combined in a novel manner which considerably increases the directional abilities of the given array of microphones.

Figures 2, 3, 4:
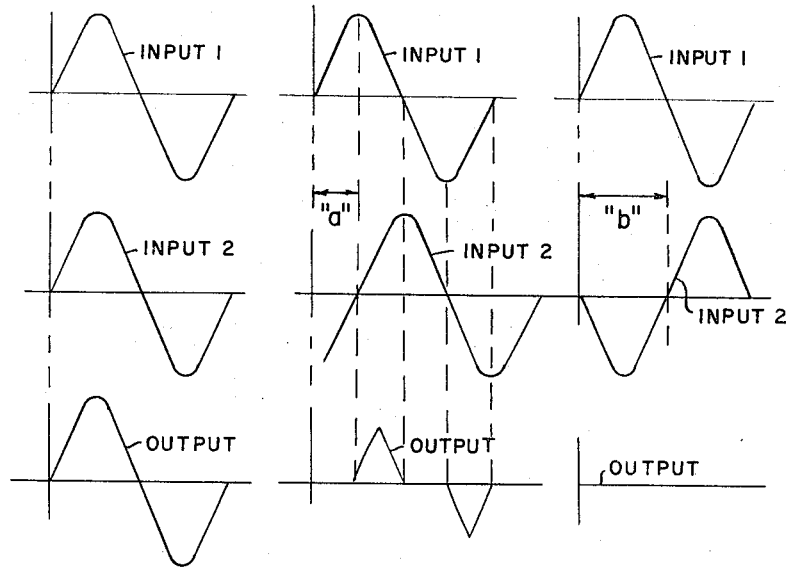
FIGS. 2, 3 and 4 are graphical representations of two input signals and an output signal of a discriminator shown in FIG. 5, under different conditions of phase-difference between the two input signals.

Referring now to FIG. 2, this illustrates how the input signals INPUT 1 and INPUT 2 from two microphones 11 and 17 would be in phase with one another when the aural axis 33 is pointed exactly at the source 27. For simplicity, it is assumed that the sound from the source is a simple sine wave. FIG. 3 illustrates the phase difference "$a$" between the outputs from two microphones 11 and 17 for a small misorientation of the aural axis 33, and FIG. 4 shows the phase difference "$b$" for a larger misorientation.

Figure 5:
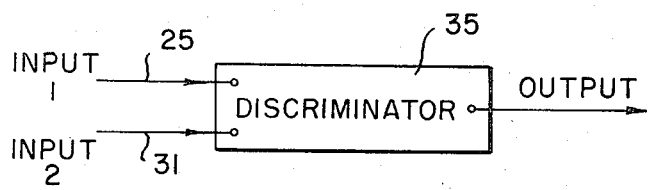
FIG. 5 is a block diagram of a discriminator for processing signals received by the microphones of FIG. 1.

FIG. 5 illustrates how the information from the two microphones is processed according to the present invention in a discriminator 35. The two microphones 11 and 17 are connected respectively by leads 25 and 31 to the terminals marked "input 1" and "input 2", and an output is derived from terminal "output". The discriminator is a circuit which obeys the following two rules:

a. when the input signals 1 and 2 are both of the same polarity, the circuit selects the input closer to zero and presents it at the output;

b. when the input signals are of opposite polarity, the circuit presents zero at the output.

FIGS. 2, 3 and 4 show this effect pictorially: In FIG. 2, the two inputs 1 and 2 are equal and in phase: since they are never of opposite polarity, rule (b) does not apply, and the output is identically similar to each input.

In FIG. 3, the two inputs 1 and 2 are equal but input 2 lags input 1 by 90°: during period 0° to 90° of input 1, since the two inputs are of opposite polarity, the output is zero: from 90° to about 135°, input 1 is larger than input 2, so that the output follows input 2; from about 135° to 180°, input 1 is smaller than input 2, and therefore the output follows input 1: from 180° to 270°, the two inputs are of opposite polarity, and therefore the output is zero; from 270° to about 315°, input 1 is larger than input 2, and the output follows input 2; from about 315° to 360°, input 1 is less than input 2, so that the output follows input 1.

In FIG. 3, where input 2 lags input 1 by 180°, at all times (except the crossover points) input 1 and input 2 are of opposite polarity, so that the output remains at zero.

It will be seen that the change in the output from the discriminator is from maximum to zero over a phase difference in the inputs of 0° to 180°.

Figure 6:
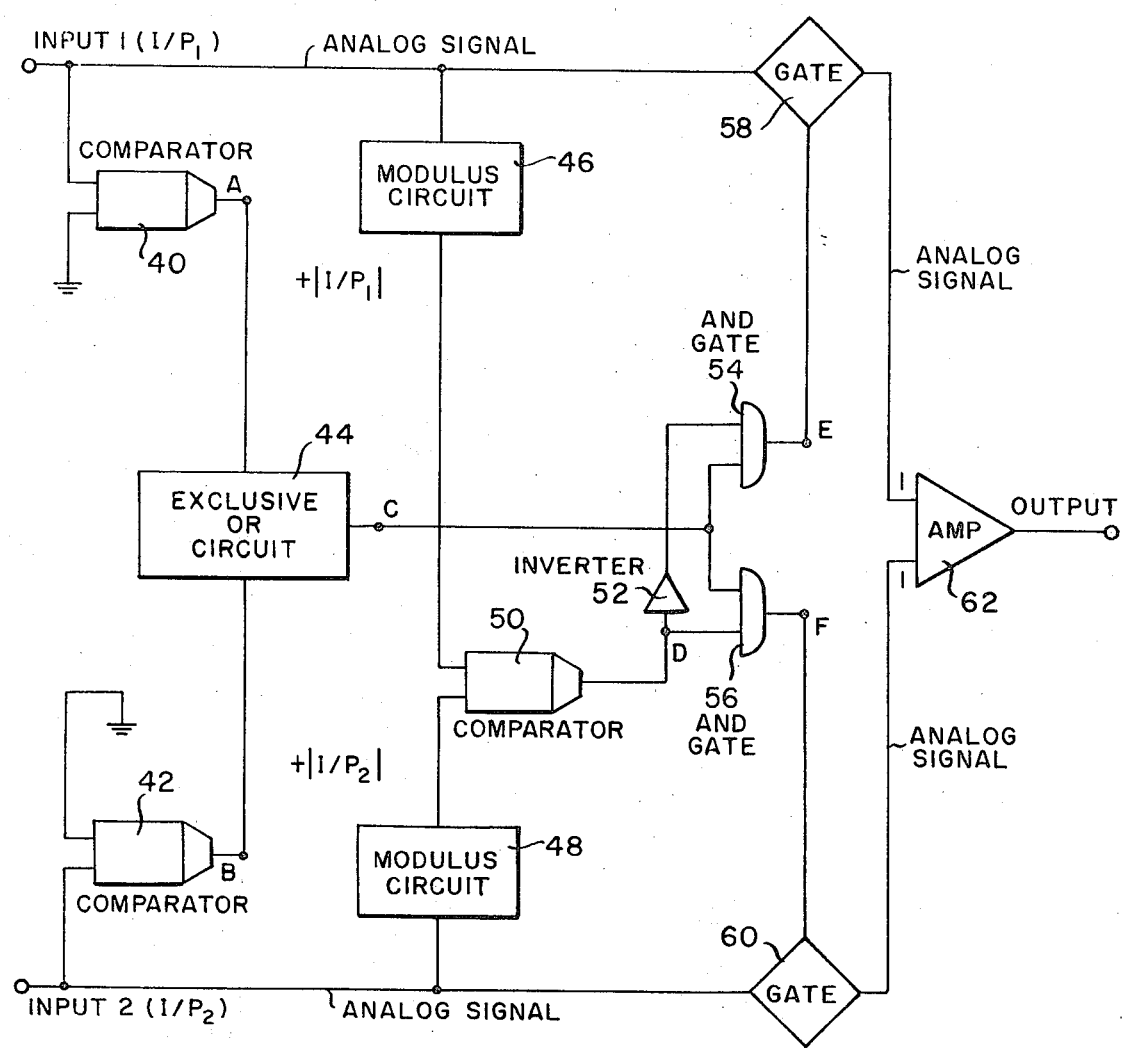
FIG. 6 is a block diagram of one embodiment of the discriminator of FIG. 5.
Figure 7:
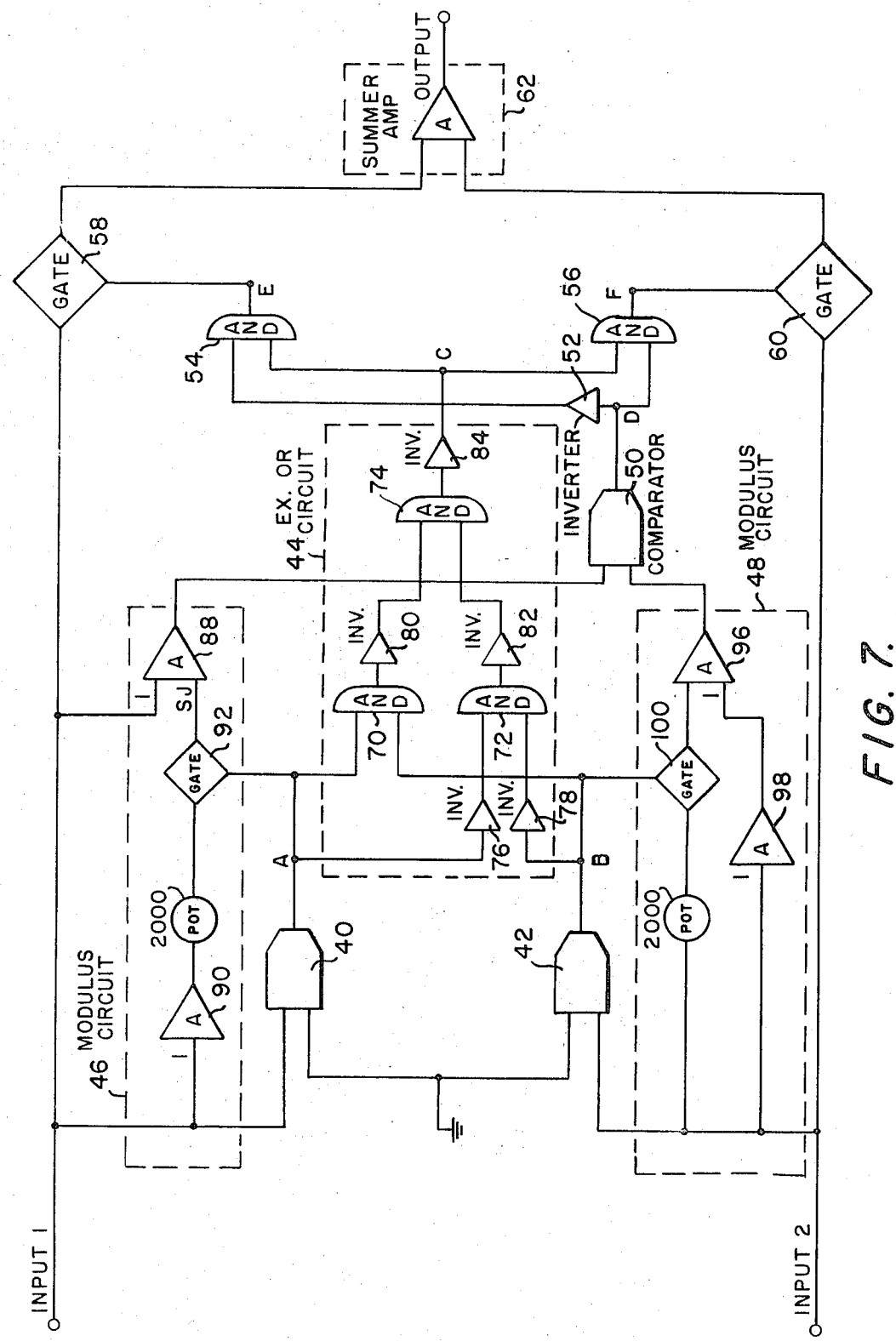
FIG. 7 is a more detailed circuit diagram of the discriminator of FIG. 6.

FIG. 6 shows in block-diagram form one form of the discriminator 35 of FIG. 5, and FIG. 7 shows the complete circuit diagram for this embodiment. The blocks shown in FIG. 6 are all well known and commercially available logic circuit components. Thus each of the comparators 40, 42 and 50 is a form of analog-to-digital converter. It receives two analog inputs, and compares them with one another. If the alegbraic sum of the two analog inputs is positive, then the logic output is HIGH (i.e. 1). If the algebraic sum of the two analog inputs is zero or negative, then the logic out is LOW (0). Thus the output is binary in nature, and will always be either 1 or 0. Each of the two modulus circuits 46 and 48 is in effect a full-wave rectifier circuit without any smoothing, so that the shape of both positive and negative parts of the output waveform are similar to those of the input waveform, but the negative parts of the waveform are rendered as positive parts. Each gate 58 and 60 acts as a high-speed relay which controls the passage of an analog signal according to the binary logic level applied to its driving input. As usual, each gate is a transistor switching circuit, rather than an electromagnetic relay. The AND gates 54 and 56 each provide a 0 output unless both of their inputs carry a 1 input. The exclusive OR circuit 44 has two inputs, and provides a 0 output except when both of its inputs have the same input signal, i.e. when both are 1 or when both are 0. When the inputs are the same, the output is a 1. The inverter 52 provides as its output a binary signal opposite to its input binary signal, i.e. a 1 input signal produces a 0 output signal and a 0 input signal produces a 1 output signal. The amplifier 62 is an operational amplifier used as a summing amplifier. These amplifiers shown in the figures are all inverting amplifiers unless otherwise noted.

In FIG. 6, several points on the diagram are denoted by the various letters A through F, and the following truth table indicates the signals at these various points for varying inputs 1 and 2.

| Case | Input Polarity I/P$_1$ | I/P$_2$ | Amplitudes (inputs) | A | B | C | D | E | F | Output |
|---|---|---|---|---|---|---|---|---|---|---|
| 1 | + | + | $|I/P_1|>|I/P_2|$ | 1 | 1 | 1 | 1 | 0 | 1 | I/P$_2$ |
| 2 | + | + | $|I/P_2|>|I/P_1|$ | 1 | 1 | 1 | 0 | 1 | 0 | I/P$_1$ |
| 3 | + | − | $|I/P_1|>|I/P_2|$ | 1 | 0 | 0 | 1 | 0 | 0 | 0 |
| 4 | + | − | $|I/P_2|>|I/P_1|$ | 1 | 0 | 0 | 0 | 0 | 0 | 0 |
| 5 | − | + | $|I/P_1|>|I/P_2|$ | 0 | 1 | 0 | 1 | 0 | 0 | 0 |
| 6 | − | + | $|I/P_2|>|I/P_1|$ | 0 | 1 | 0 | 0 | 0 | 0 | 0 |
| 7 | − | − | $|I/P_1|>|I/P_2|$ | 0 | 0 | 1 | 1 | 0 | 1 | I/P$_2$ |
| 8 | − | − | $|I/P_2|>|I/P_1|$ | 0 | 0 | 1 | 0 | 1 | 0 | I/P$_1$ |
| 9 | + | + | $|I/P_2|=|I/P_1|$ | 1 | 1 | 1 | 1 | 0 | 1 | I/P$_2$ |
| 10 | − | − | $|I/P_2|=|I/P_1|$ | 0 | 0 | 1 | 1 | 0 | 1 | I/P$_2$ |

In practice, the input 1 may not have exactly the same amplitude as the input 2, but the modification of the output by practical differences in these inputs are small, and for simplicity it will be assumed that the amplitudes are the same.

In operation, comparator 40 will provide a digital signal at A which will be 1 while input 1 is positive, and will otherwise be 0. Comparator 42 will provide a similar output at B depending upon the polarity of input 2. The exclusive OR circuit 44 will then provide at C a binary signal which will be 1 when both inputs 1 and 2 are positive, or negative, and a signal 0 when the inputs are of opposite sign. As long as the signal at C is 0, neither of the AND gates 54 and 56 will be enabled, so that both gates 58 and 60 will be non-conducting, so that the output applied to amplifier 62 will be zero and the output from the whole circuit will be zero.

When the signal at C is 1, then for each of the AND gates 54 and 56 one input is provided.

The comparator 50 receives at all times a full-wave rectified but unsmoothed version of the input 1 as a first input, and a full-wave rectified but unsmoothed version of the input 2 as a second input. If the instantaneous numerical value of input 1 is greater than the instantaneous numerical value of input 2, then the output of comparator 50, i.e., at the point D, is 1. On the other hand, if the opposite is true, the signal at point D is 0. The signal at D is applied directly as the second input to AND gate 56, while an inversion of the signal is applied directly as the signal to AND gate 54. Thus if signal input 1 is greater than signal input 2 (and they are of the same polarity at point E appears a signal 1 so that gate 60 is enabled and the analog signal on input 2 is applied to the amplifier 62. On the other hand, if signal input 2 is greater than input signal 1 (and they are of the same polarity) at point E appears a 1 signal and gate 58 is enabled so that the analog signal input 1 is applied to the amplifier 62.

It will be seen that the smaller of the two input signals is applied to the amplifier 62 as long as the signals are of the same polarity. In the case of FIG. 2, when the two signals are equal and of the same polarity, the output is input 2. This result is necessary to avoid the occurrence of zero output when the sound locator is precisely directed at the target, and is achieved by setting comparator 50 to give a 1 output when its input 1 is equal to input 2.

Referring now to FIG. 7, it will be seen that the exclusive OR circuit 44 includes three AND gates 70, 72 and 74 and five inverters 76, 78, 80, 82 and 84. The modulus circuit 46 makes use of an operational amplifier 88 used as a differential amplifier to the non-inverting input of which is applied input 1, the inverting input being supplied with the same signal which however is inverted in an amplifier 90 and then gated by gate 92 which is driven by the output on lead A. The two devices given reference numeral 2000 are potentiometers used to adjust the levels of the inputs. Each potentiometer provides a gain of 0.2000 and is followed by an amplifier having a gain of 10 so that the overall gain of the two together is 2. Modulus circuit 48 includes differential operational amplifier 96, inverting amplifier 98 and gate 100.

Figure 8:
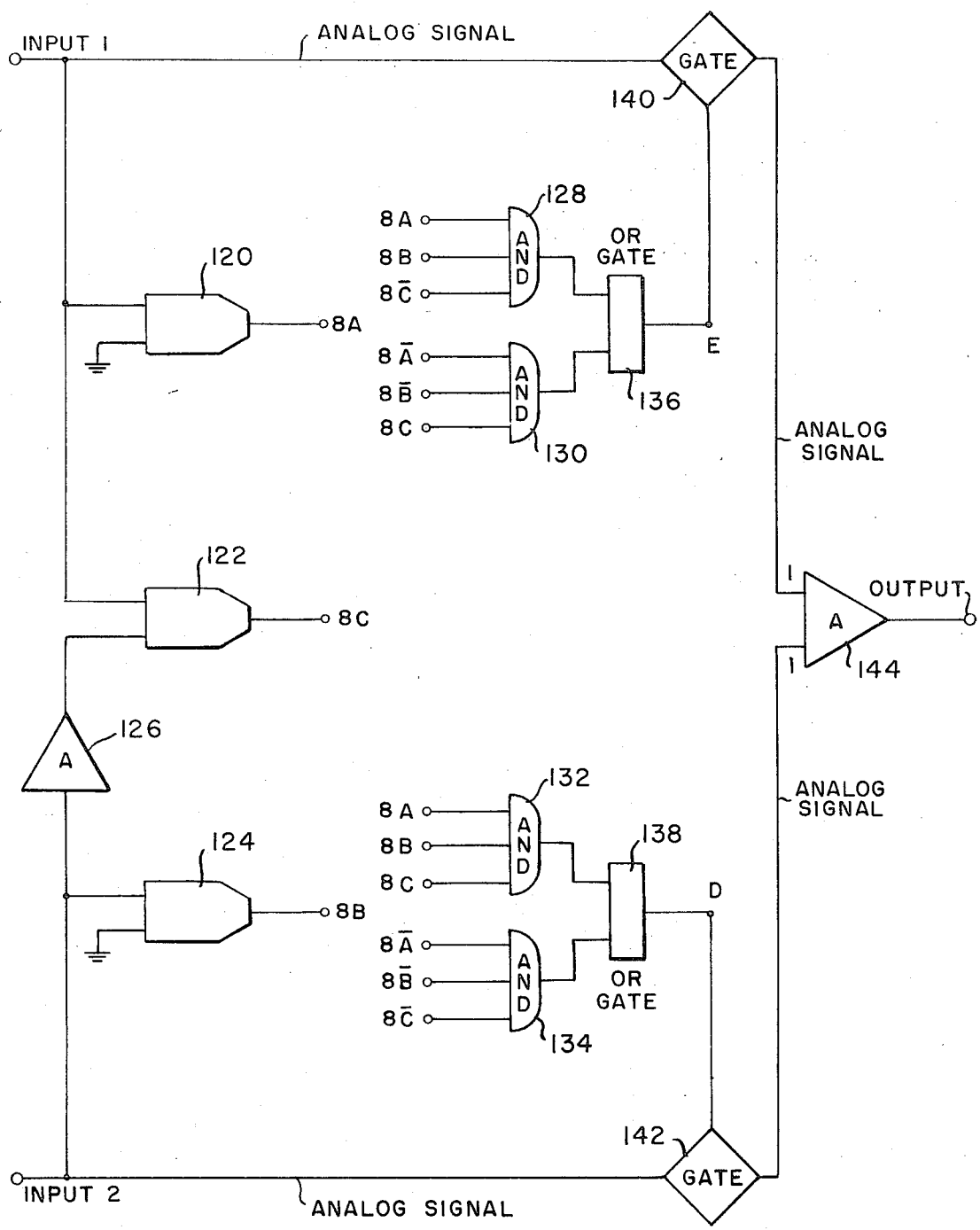
FIG. 8 is a block diagram of a second embodiment of the discriminator of FIG. 5.
Figure 9:
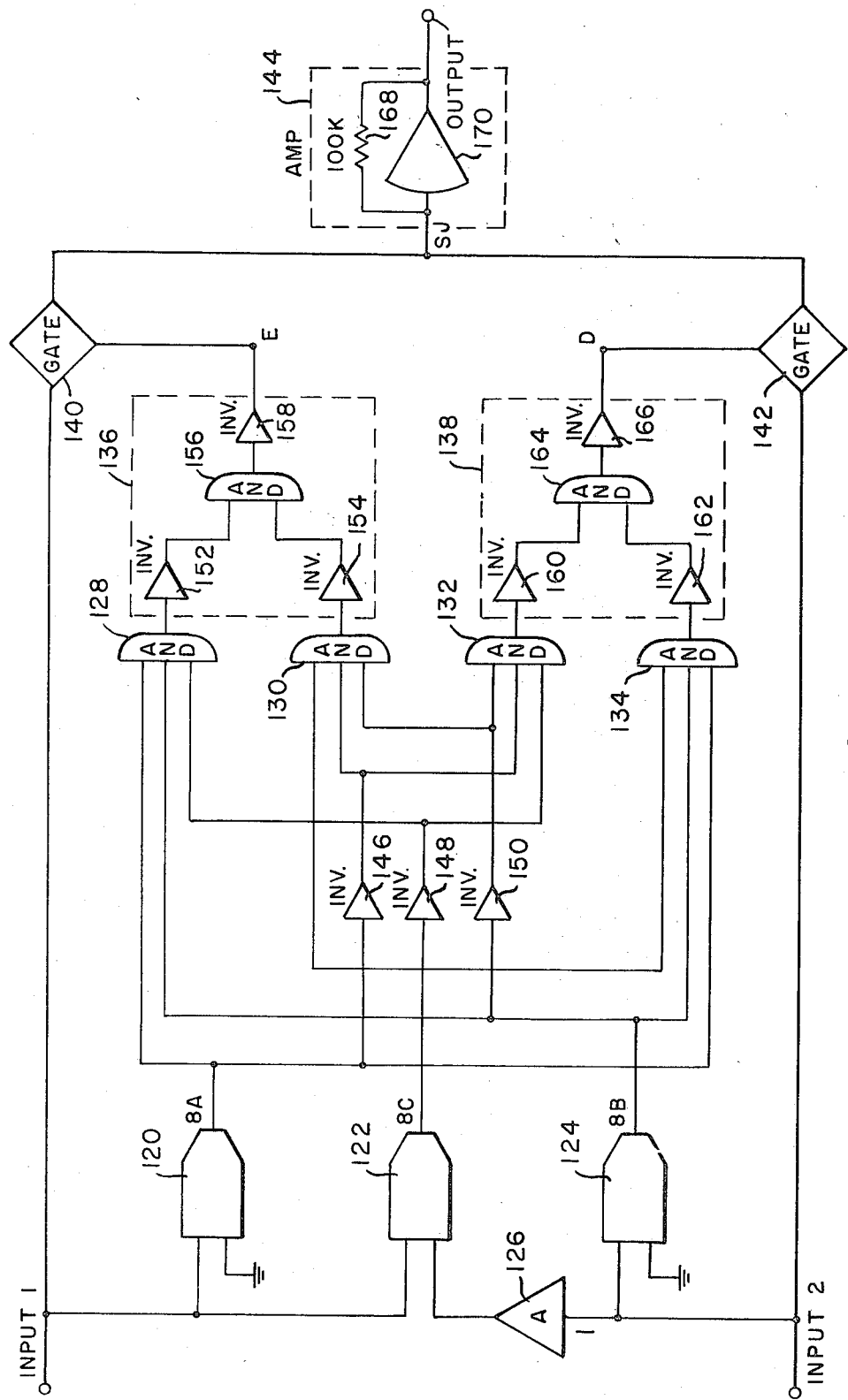
FIG. 9 is a more detailed circuit diagram of the discriminator of FIG. 8.

FIG. 8 shows an alternative form of the discriminator 35 and FIG. 9 is a more detailed circuit of that discriminator. Input 1 is applied to both comparator 120 and comparator 122, while input 2 is applied directly to comparator 124 and, through an inverting amplifier 126 having unitary gain, to the second input of comparator 122. The second inputs to comparators 120 and 124 are both ground.

The outputs of the three comparators 120, 122, and 124 are designated 8A, 8C and 8B respectively. Input 1 is applied through gate 140 to a first input of a summing amplifier 144, and input 2 is applied through gate 142 to a second input of the summing amplifier 144. Gate 140 is driven by the output of an OR gate 136, and gate 142 is driven by the output of an OR gate 138. OR gate 136 has two inputs respectively from AND gates 128 and 130 and similarly OR gate 138 has two inputs respectively from AND gates 132 and 134. As mentioned above, the outputs of the three comparators are designated 8A, 8B, and 8C, and in conventional manner these binary outputs will have their inverses indicated by the notations $\overline{8A}$, $\overline{8B}$ and $\overline{8C}$. Each of the four AND gates has three inputs, and these are as follows:

| Gate 128 | Inputs are | $\overline{8A}$ | 8B | $\overline{8C}$ |
| Gate 130 | Inputs are | 8A | $\overline{8B}$ | 8C |
| Gate 132 | Inputs are | 8A | 8B | 8C |
| Gate 134 | Inputs are | $\overline{8A}$ | 8B | 8C |

The following truth table shows the relationship between the two inputs 1 and 2 and the signals at points A through E in FIG. 8. It will be seen that comparators 120 and 124 establish whether the potentials of the two inputs are the same, while comparator 122 establishes which is the smaller of the two input signals. The comparator digital output signals as 8A, 8B and 8C and their inversions control the four AND gates and the two OR gates so that the smaller of the two inputs 1 and 2 is passed by that gate which is enabled to the amplifier 144, unless the two inputs are of opposite polarity, in which case both of the gates 140 and 142 are non-conductive so that the signal applied to amplifier 144, and its output, are both zero.

| Case | Input Polarity 1 | Input Polarity 2 | Input Amplitude | A | B | C | A.B.C. | Ā.B.C. | A.B̄.C. | A.B.C̄. | $OR_1$ | $OR_2$ | Output |
|---|---|---|---|---|---|---|---|---|---|---|---|---|---|
| 1 | + | + | I/P$_1$>I/P$_2$ | 1 | 1 | 1 | 0 | 0 | 1 | 0 | 0 | 1 | I/P$_2$ |
| 2 | + | + | I/P$_2$>I/P$_1$ | 1 | 1 | 0 | 1 | 0 | 0 | 0 | 1 | 0 | I/P$_1$ |
| 3,4 | + | − | I/P$_1$>I/P$_2$ | 1 | 0 | 1 | 0 | 0 | 0 | 0 | 0 | 0 | 0 |
| 5,6 | − | + | I/P$_2$>I/P$_1$ | 0 | 1 | 0 | 0 | 0 | 0 | 0 | 0 | 0 | 0 |
| 7 | − | − | I/P$_1$>I/P$_2$ | 0 | 0 | 1 | 0 | 1 | 0 | 0 | 1 | 0 | I/P$_1$ |
| 8 | − | − | I/P$_2$>I/P$_1$ | 0 | 0 | 0 | 0 | 0 | 0 | 1 | 0 | 1 | I/P$_2$ |
| 9 | + | + } | I/P$_2$=I/P$_1$ | 1 | 1 | 1 | 0 | 0 | 1 | 0 | 0 | 1 } | I/P$_2$ |
| 10 | − | − } |  | 0 | 0 | 1 | 0 | 1 | 0 | 0 | 0 | 1 } |  |

As in the case of the circuit of FIG. 7, the arrangement is such that when signals input 1 and input 2 are equal, the output from comparator 50 is a digital 1, so that in these circumstances input 2 always appears as the output.

FIG. 9 shows the complete circuit of the arrangement of FIG. 8. It will be seen that three inverters 146, 148 and 150 which respectively produce signals 8Ā, 8C̄ and 8B̄. OR gate 136 is formed by a group of three inverters 152, 154, and 158 and an AND gate 156. Similarly, OR gate 138 is formed by a group of three inverters 160, 162 and 166 and an AND gate 164. The feedback resistor 168 of 100,000 ohms in the operational amplifier 144 is shown in this Figure.

Figure 10:
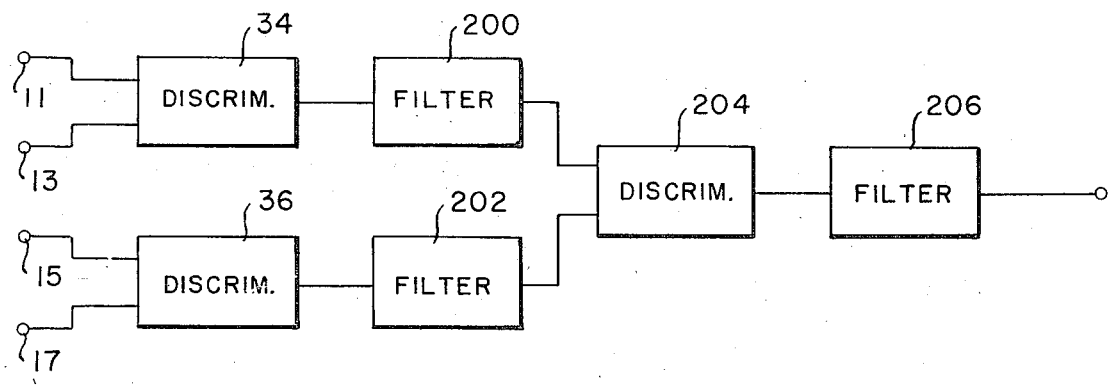
FIG. 10 is a diagram showing one use of the discriminator of FIG. 5 in a four-microphone acoustic direction finding system.

Referring now to FIG. 10, this shows an arrangement in which the outputs from four microphones 11, 13, 15 and 17 are applied in pairs respectively to two discriminators 34 and 36, the outputs of these discriminators are passed respectively through two filters 200 and 202, and the outputs of the two filters applied as inputs to a third discriminator 204. The output from discriminator 204 is passed through a third filter 206, the output from which provides the useful output from the arrangement.

The three discriminators 34, 36 and 204 are discriminators of the form shown in either FIGS. 6 and 7, or FIGS. 8 and 9, or are equivalents thereof. The three filters 200, 202 and 206 are linear band-pass filters which block the passage of signals having frequencies outside a range centered on that of the signal being observed.

Figure 11:
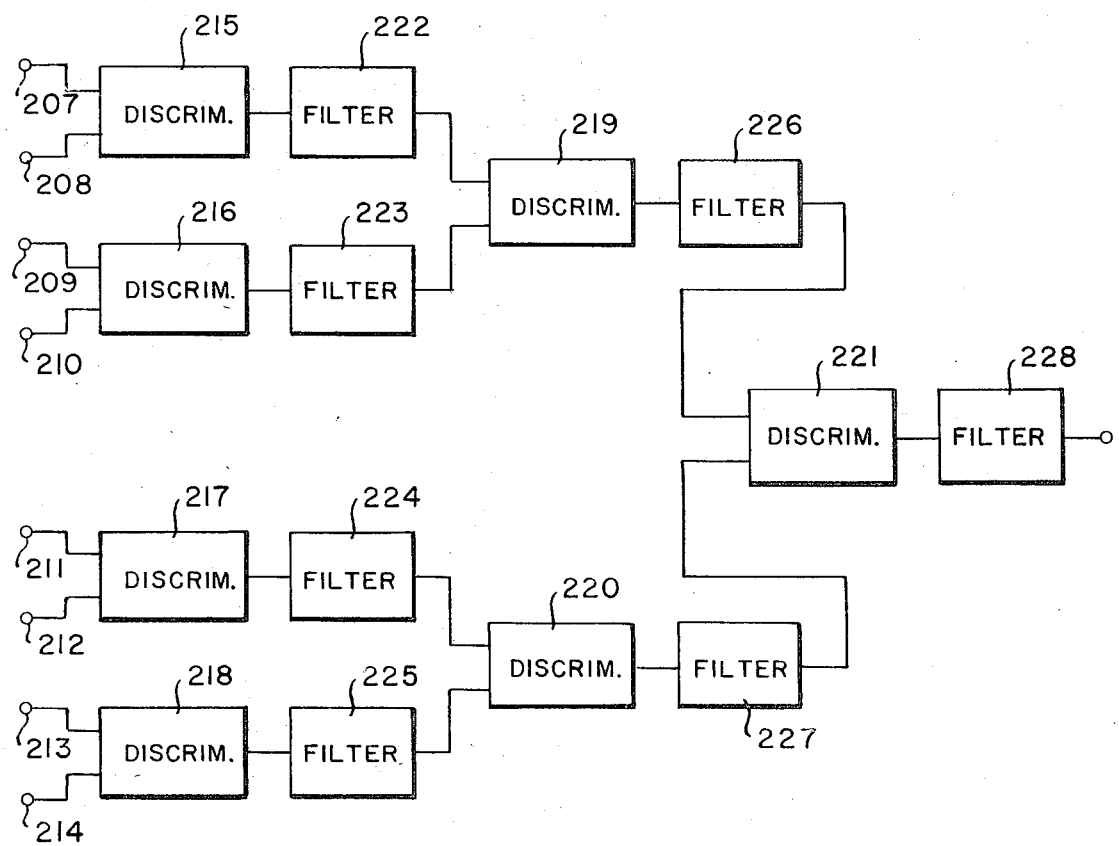
FIG. 11 is a diagram showing another use of the discriminator of FIG. 5 is an eight-microphone acoustic direction-finding system.

FIG. 11 shows an arrangement using eight microphones, and it will be seen that the general principle shown in FIG. 10 is followed. The microphones are designated 207 through 214, the discriminators 215 through 221, and the filters 222 through 228.

Figure 12:
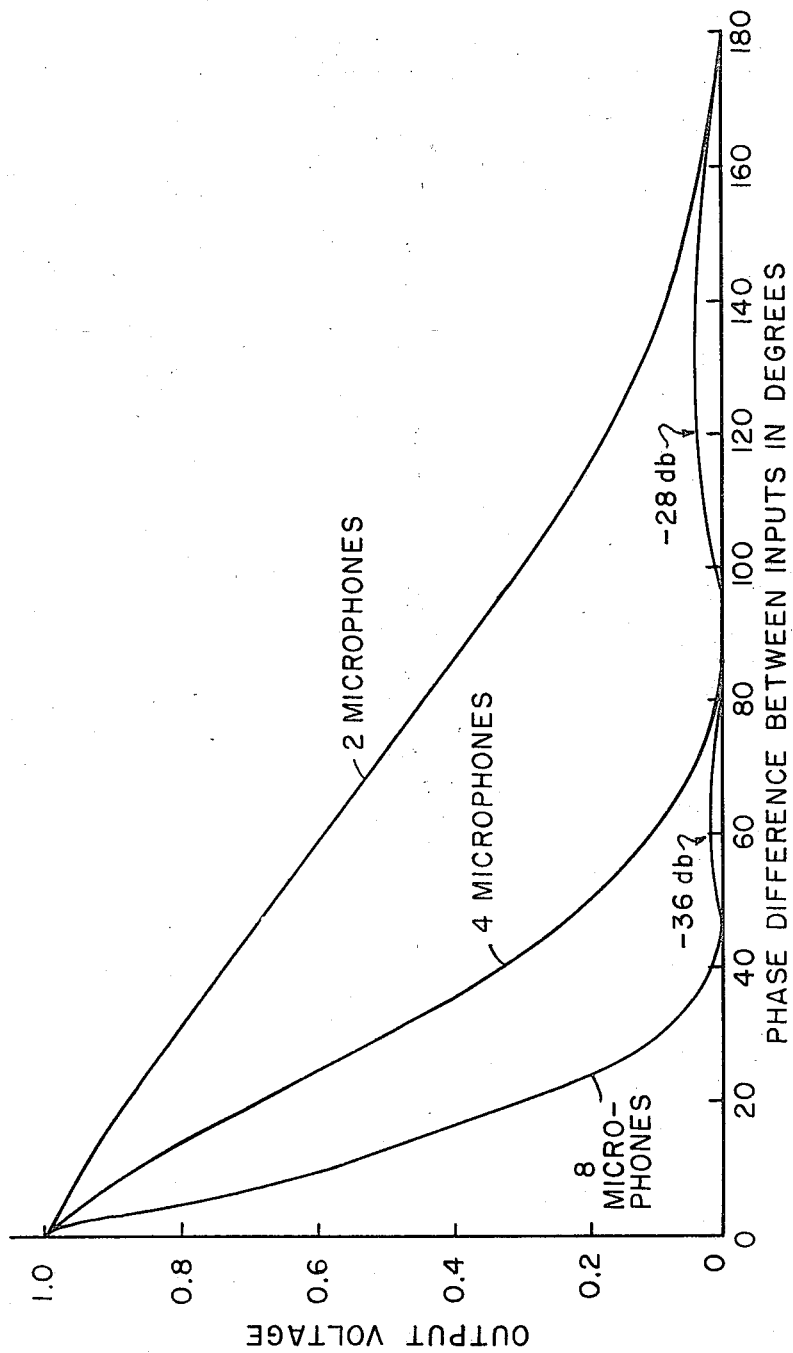
FIG. 12 is a graphical illustration of the effectiveness of the discriminator used according to FIG. 5, FIG. 10 and FIG. 11.

In both FIGS. 10 and 11, the microphone spacing is one half-wave-length of the sound being investigated. In FIG. 12 the effectiveness of the two-microphone device of FIG. 6 or FIG. 8, the four-microphone device of FIG. 10 and the eight-microphone device of FIG. 11, are shown in graphical plots of "phase difference between inputs in degrees" against "output voltage", the arbitrary voltage 1 corresponding to the maximum voltage received when perfect orientation of the direction finder is achieved. This "voltage" is the R.M.S. voltage of the input signal.

The object of using the discriminator is to produce as narrow a beam as possible for the number of receiving elements or microphones employed, i.e., to obtain high bearing accuracy with minimum array size. The undesirable output amplitude statistics and the corresponding degradation in detection capability are accepted as the price to be paid for small size. It is noteworthy that the beam lobe produced by this type of signal processing are pointed at maximum response, whereas the beam lobe for normal additive array beams are flat topped. Also, with the systems now proposed, the side lobes are very small indeed.

An experimental array of four microphones has been constructed which gives a measured beam width of 10° and side lobes with a −25 dB response. This array yielded a bearing accuracy of 1.6° average error, ascertained by the result of a large number of attempts to locate a given sound source. To achieve this bearing accuracy with a conventional additive array would require about 30 microphones. For many applications, a 30 microphone array (at ½ wavelength spacings) would be impractically large.

The performance gain of about 6 dB for the four microphone array is equivalent to an additive array for the same number of microphones, and is the gain that applies to a very low input signal-to-noise ratio. As the input signal-to-noise ratio increases, for example as the target approaches, the gain of the array also increases. In other words, when using this type of array the target will tend to be detected with a low false-alarm rate if it is detected at all. Once detected, a good bearing can readily be obtained.

The invention has been described above, by way of example, applied to an acoustic sound direction-finding equipment. However, since the inputs to the discriminator are merely two versions of a common a.c. signal, with a variable phase shift between the two versions, the basic principle of the invention can be applied to other situations in which a similar two versions of a common a.c. signal occur, with a variable phase shift between the two versions.

Thus in an arrangement in which the discriminator was engineered to operate at up to say 100 megahertz, it can be used in a radio direction-finding system in which the two microphones providing the two versions of the common a.c. signal are replaced with two antennas receiving phase-shifted versions of a common radio-frequency signal.

In an alternative use of the invention, the presence of a phase-shifter between two signals derived from a common source may indicate an error in a measurement, and in such a case the discriminator of the present invention provides a highly accurate way of ascertaining when that error has been reduced to a very small value. The measurement can be a physical measurement of any type, suitable transducers being used to produce first a signal indicative of the quantity to be measured, and secondly a signal indicative of the setting of a measuring instrument.

What is claimed is:

1. A phase difference detector adapted to receive first and second versions from two different sources of a common input signal, with a variable phase difference between the two versions, and to provide an output which is a non-linear indication of the said phase difference, said detector comprising:
    means for comparing the two versions, and when both are of the same polarity, for selecting the version which has an instantaneous value closer to zero, and for presenting that version as the instantaneous output; and
    means for comparing the two versions, and when the two versions are of opposite polarity, for presenting zero as the instantaneous output.

2. A phase difference detector as in claim 1, in which the first and second versions are applied respectively to first and second gates as analog signals, each gate being arranged, when enabled, to pass the said analog signal on to the output from the detector, and the first and second gates being selectively enabled to provide the specified output.

3. A phase difference detector as in claim 2, having first comparator means to ascertain whether the two versions are of different polarity and, when that condition exists, disable both said gates.

4. A phase-difference detector as in claim 2, having second comparator means to ascertain which of the two versions has instantaneously the smaller value, and being arranged to enable the appropriate first or second gate to permit the smaller-valued signal to pass to the output, unless the two values are of opposite polarity.

5. A phase-difference detector as in claim 2, having second comparator means for ascertaining whether the two versions are instantaneously equal or whether one is smaller than the other, said second comparator means being arranged to enable the appropriate first or second gate to permit that smaller signal to pass to the output, unless the two versions are of opposite polarity, and being arranged, when the two versions are equal, to enable a preselected one of the two gates to permit the associated version to pass to the said output.

6. A phase-difference detector as in claim 4, wherein said second comparator means ascertain whether the two versions are instantaneously equal or whether one is smaller than the other, and is arranged to enable the appropriate first or second gate to permit that smaller signal to pass to the output, unless the two versions are of opposite polarity, and is arranged, when the two versions are equal, to enable a preselected one of the two gates to permit the associated version to pass to the said output.

7. A direction-finding system having two transducers arranged to supply first and second versions respectively of a common input signal coming from an object whose direction the system is required to ascertain, the phase difference or lack of phase difference between the two versions being indicative of the direction of the said object relative to the said transducers, and the outputs from the two transducers being applied to a phase-difference detector,
    said detector comprising means for comparing the two versions and, when both are of the same polarity, for selecting the version which has an instantaneous value closer to zero, and for presenting that version as the instantaneous output, and means for comparing the two versions and, when the two versions are of opposite polarity, for presenting zero as the instantaneous output.

8. A direction-finding system according to claim 7, in which the output of each phase-difference detector is processed by a band-pass filter to reduce or eliminate noise signals having a frequency appreciably different from a preselected frequency chosen to be representative of the common input signal coming from the object whose direction the system is required to ascertain.

9. A direction-finding system according to claim 7, in which the transducers are microphones and the common input signal is an acoustic signal coming from the object whose direction the system is required to ascertain.

10. A direction-finding system having an even plurality of transducers arranged in associated pairs, each transducer of a pair supplying first and second versions respectively of a common input signal coming from an object whose direction the system is required to ascertain, each pair of transducers being connected to a different one of a plurality of phase-difference detectors as in claim 7, the outputs of said phase difference detectors being fed in pairs to other phase difference detectors and their outputs being combined repeatedly in the same arrangement until a single final output indicative of the direction of said object is obtained.

* * * * *